(12) United States Patent
Boettcher

(10) Patent No.: US 10,581,296 B2
(45) Date of Patent: Mar. 3, 2020

(54) GENERATOR ROTOR FOR A GENERATOR OF A WIND TURBINE OR A HYDROELECTRIC POWER PLANT, AND A GENERATOR, WIND TURBINE AND HYDROELECTRIC POWER PLANT COMPRISING SAME

(71) Applicant: Wobben Properties GmbH, Aurich (DE)

(72) Inventor: Bernd Boettcher, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/093,098

(22) PCT Filed: Apr. 5, 2017

(86) PCT No.: PCT/EP2017/058047
§ 371 (c)(1),
(2) Date: Oct. 11, 2018

(87) PCT Pub. No.: WO2017/178291
PCT Pub. Date: Oct. 19, 2017

(65) Prior Publication Data
US 2019/0068023 A1  Feb. 28, 2019

(30) Foreign Application Priority Data

Apr. 13, 2016 (DE) .................. 10 2016 206 179

(51) Int. Cl.
*F03B 13/08* (2006.01)
*F03D 9/25* (2016.01)
(Continued)

(52) U.S. Cl.
CPC ................. *H02K 5/24* (2013.01); *F03B 3/04* (2013.01); *F03B 13/083* (2013.01); *F03D 9/25* (2016.05);
(Continued)

(58) Field of Classification Search
USPC ......... 290/44, 55; 415/182.1, 213.1; 416/95, 416/170 R
See application file for complete search history.

(56) References Cited

U.S. PATENT DOCUMENTS 6,460,382 B1  10/2002  Kim et al.
8,004,107 B2   8/2011  Stiesdal
(Continued)

FOREIGN PATENT DOCUMENTS

DE  102004035382 A1  3/2006
DE  102008045500 A1  3/2010
(Continued)

*Primary Examiner* — Pedro J Cuevas
(74) *Attorney, Agent, or Firm* — Seed Intellectual Property Law Group LLP

(57) ABSTRACT

A generator rotor for a generator, in particular a slowly rotating generator, of a wind turbine or a hydroelectric power plant. The rotor generator comprises a rotor belt for holding a plurality of pole shoes, a hub flange for fixing the generator rotor to a shaft, in particular a main shaft or a transmission shaft, of the wind turbine, or for fixing to a number of turbine blades of the hydroelectric power plant, and a carrier structure which is respectively non-rotatably connected to the rotor belt on the one hand and to hub flange on the other hand, wherein the rotor belt comprises a metallic material having a first degree of damping ($D_1$) and at least one of: the carrier structure or the hub flange partially or completely comprises a material having a second degree of damping ($D_2$), wherein the second degree of damping ($D_2$) is higher than the first degree of damping ($D_1$).

18 Claims, 5 Drawing Sheets

(51) Int. Cl.
  *F03D 15/20*  (2016.01)
  *F03B 3/04*  (2006.01)
  *H02K 5/24*  (2006.01)
  *H02K 7/18*  (2006.01)
  *H02K 1/30*  (2006.01)
  *H02K 1/02*  (2006.01)

(52) U.S. Cl.
  CPC ............... *F03D 15/20* (2016.05); *H02K 1/30* (2013.01); *H02K 7/1823* (2013.01); *H02K 7/1838* (2013.01); *F05B 2210/16* (2013.01); *F05B 2220/706* (2013.01); *F05B 2220/7066* (2013.01); *F05B 2220/70642* (2013.01); *F05B 2240/133* (2013.01); *F05B 2260/96* (2013.01); *H02K 1/02* (2013.01); *Y02E 10/22* (2013.01); *Y02E 10/223* (2013.01); *Y02E 10/725* (2013.01)

(56) References Cited

U.S. PATENT DOCUMENTS

| | | | |
|---|---|---|---|
| 8,159,103 B2 | 4/2012 | Rodriguez Rodriguez et al. | |
| 8,274,191 B2* | 9/2012 | Stiesdal | H02K 1/148 310/216.113 |
| 8,405,243 B2* | 3/2013 | Siegfriedsen | F03D 80/70 290/55 |
| 8,669,685 B2* | 3/2014 | Casazza | H02K 1/16 310/216.001 |
| 9,219,387 B2 | 12/2015 | Kolehmainen | |
| 9,394,887 B2* | 7/2016 | Roer | F03D 80/00 |
| 9,735,638 B2 | 8/2017 | Herz et al. | |
| 2007/0132335 A1 | 6/2007 | Ionel et al. | |
| 2008/0143198 A1 | 6/2008 | Bi et al. | |
| 2008/0313884 A1 | 12/2008 | Jeung | |
| 2010/0066096 A1* | 3/2010 | Stiesdal | H02K 1/148 290/55 |
| 2010/0123318 A1* | 5/2010 | Casazza | H02K 1/16 290/55 |
| 2010/0164232 A1* | 7/2010 | Siegfriedsen | F03D 80/70 290/55 |
| 2011/0293416 A1 | 12/2011 | Rohden | |
| 2012/0306212 A1* | 12/2012 | Sarmiento Munoz | H02K 7/1838 290/55 |
| 2013/0084177 A1* | 4/2013 | Eriksen | F03D 9/25 415/213.1 |
| 2013/0315736 A1* | 11/2013 | Frank | F16C 19/545 416/170 R |
| 2013/0334819 A1* | 12/2013 | Fricke | F03D 1/0691 290/44 |
| 2014/0119916 A1* | 5/2014 | Faulder | F01D 5/22 416/95 |
| 2014/0133985 A1* | 5/2014 | Mongeau | F16C 17/02 416/95 |
| 2014/0183989 A1 | 7/2014 | Lenschow | |
| 2014/0225373 A1* | 8/2014 | Roivainen | H02K 5/24 290/55 |
| 2015/0016976 A1* | 1/2015 | Roer | F03D 15/20 415/182.1 |
| 2015/0180288 A1* | 6/2015 | Roer | H02K 19/16 290/55 |
| 2017/0005543 A1* | 1/2017 | Silander | H02K 19/24 |

FOREIGN PATENT DOCUMENTS

| | | |
|---|---|---|
| DE | 102010030205 A1 | 12/2011 |
| DE | 102011006680 A1 | 10/2012 |
| DE | 102013101957 A1 | 8/2014 |
| EP | 1094145 A2 | 4/2001 |
| EP | 2028744 A1 | 2/2009 |
| EP | 2143941 A1 | 1/2010 |
| EP | 2442432 A2 | 4/2012 |
| RU | 2508467 C2 | 2/2014 |

\* cited by examiner

GENERATOR ROTOR FOR A GENERATOR OF A WIND TURBINE OR A HYDROELECTRIC POWER PLANT, AND A GENERATOR, WIND TURBINE AND HYDROELECTRIC POWER PLANT COMPRISING SAME

BACKGROUND

Technical Field

The invention concerns a generator rotor for a generator, in particular a slowly rotating generator, of a wind turbine or a hydroelectric power plant. The invention further concerns a generator having such a generator rotor and a wind turbine having such a generator.

Description of the Related Art

Wind turbines are generally known. They have a tower on which a pod is rotatably mounted. Mounted on the pod, frequently in the interior thereof, are a machine carrier, a generator, a drive shaft for the generator, optionally a transmission, and a rotor hub having a number of rotor blades which rotate in the wind to drive the generator. The generator usually has a generator stator carried by the machine carrier and a generator rotor which rotates relative to the generator stator, preferably inwardly or outwardly thereof.

Hydroelectric power plants use turbines for generating electrical energy by means of the rotational drive of turbine blades, using the kinetic energy of a flow of water. In that respect a difference is basically made between turbines which by way of a rotor shaft transmit a torque into a region outside a flow passage, where then the torque at the rotor shaft is used to drive a generator, and those turbines in which the turbine rotors are connected directly to a rotor of a generator. The first-mentioned types are known inter alia from DE 10 2008 045 500 A1. In the latter case this is referred to as so-called straight-flow turbines. If the axis of rotation of the turbines is substantially parallel to the direction of flow of the water that is referred to as axial turbines. The generators which are used in the above-mentioned hydroelectric plants can be of a design which is substantially identical in function to the generators of wind turbines, and for that reason the invention also extends to that field.

The generator rotor has a plurality of pole shoes on a so-called rotor belt. The pole shoes rotate relative to the stator windings of the generator stator. Between the pole shoes and the windings of the generator stator there is an air gap which is as narrow as possible. A voltage is induced in the generator stator by way of an exciter field in the generator rotor. Torque fluctuations occur by virtue of the rotating exciter field which always behaves in a slightly unsteady fashion. Those torque fluctuations usually involve a frequency dependent on the speed of rotation of the generator rotor and cause vibrations in the generator.

The vibrations produced in the generator in that way are transmitted by way of the carrier structure and the hub flange to the main shaft of the wind turbine or component parts of the hydroelectric plant and in the first-mentioned case by way of same through the rotor hub into the rotor blades.

As wind turbines are increasingly also being erected in the proximity of populated areas particular attention is being paid to avoiding troublesome sound emissions to the greatest possible extent. In addition it is to be noted for known wind turbines that the construction of the carrier structure provided in the generator rotor is comparatively complicated and expensive. A multi-part steel structure is usually involved, which has to be manufactured in a correspondingly large number of working steps by means of welding and other joining technologies. The material and cost involvement is correspondingly high.

On the priority application in relation to the present application the German Patent and Trade Mark Office searched the following state of the art: DE 10 2008 045 500 A1, DE 10 2010 030 205 A1 and DE 10 2011 006 680 A1.

BRIEF SUMMARY

Provided is a generator rotor of the kind set forth in the opening part of this specification such that the wind turbine or the hydroelectric power plant that is improved in respect of the vibration characteristic and in particular overall outputs lower levels of noise emission. Furthermore provided is a generator rotor of the kind set forth in the opening part of this specification that the manufacture thereof can be less costly and/or less time-consuming.

Provided is a generator rotor have a rotor belt for holding a plurality of pole shoes, a hub flange for fixing the generator rotor to a shaft, in particular a main shaft or a transmission shaft, of the wind turbine, and a carrier structure which is respectively non-rotatably connected to the rotor belt on the one hand and to hub flange on the other hand, wherein the rotor belt comprises a metallic material having a first degree of damping and at least one of: the carrier structure or the hub flange partially or completely comprises a material having a second degree of damping, wherein the second degree of damping is higher than the first degree of damping. The term degree of damping is used in accordance with the invention to denote the Lehr's damping ratio. The Lehr's damping ratio can be determined in generally known manner or is known in the form of literature references for a large number of materials. Insofar as reference is made to "completely" in accordance with the invention in respect of the material that is to be interpreted as meaning that the essential structure elements responsible for force transmission comprise the respective material but that any assembly means and other use or fixing means do not necessarily have to consist of that material.

The invention follows the approach of reducing the transmission of sound from the pole shoes at the rotor belt in the direction of the shaft of the wind turbine deliberately by increased energy dissipation. In that respect the invention makes use of a number of insights:

By virtue of using a different material for the carrier structure and/or the hub flange, in each case relative to the metallic material of the rotor belt, a multi-part structural configuration is compelled to be used; a monolithic structure in which for example the carrier structure is connected in one piece or in material-bonded relationship to the rotor belt and the hub flange is thereby no longer possible. In the transition from the metallic material to the material of the carrier structure and/or the hub flange energy is necessarily already dissipated, which damps the vibration emanating from the rotor belt.

By virtue of the fact that the material of the carrier structure and/or the hub flange has a higher degree of damping than the metallic material of the rotor belt, further energy is additionally dissipated in the carrier structure or the hub flange respectively.

The term a slowly rotating generator is used to denote a generator involving a rotary speed of 50 revolutions per minute or less. The generator is preferably a multi-pole synchronous ring generator. The term multi-pole means a pole number of 48 or more, preferably 96 or more.

In a preferred development the first degree of damping is in a region of $D_1$=0.002 or less, preferably in a region of $D_1$=0.0015 or less. Most kinds of steel usually involve a degree of damping in those regions.

In a preferred embodiment the second degree of damping is n times the first degree of damping, wherein n is equal to 2 or higher. The higher the second degree of damping is relative to the first degree of damping, the correspondingly greater is the dissipation of energy within the carrier structure, or within the hub flange. It is to be noted in regard to construction however that the carrier structure or the hub flange must always still have sufficient stiffness, shear strength and compressive strength for the transmission of force between the rotor belt and the hub flange or transmission shaft. It will be noted that besides the nature of the material, that can also be positively influenced by additional reinforcement measures in the form of ribs, webs and so forth.

In a further preferred embodiment at least one of: the carrier structure or the hub flange partially or completely comprises one of the following materials:
concrete;
concrete composite, in particular steel-reinforced concrete or fiber-reinforced concrete;
solid wood;
plywood;
laminated timber;
glass fiber-reinforced plastic; or
carbon fiber-reinforced plastic.

If the concrete composite has fiber components those fibers are preferably selected from the list comprising: steel fibers, carbon, glass, bamboo, hemp or aramid fibers. In embodiments in which plywood is selected for the material of the carrier structure or the hub flange in particular veneer plywood has been found to be advantageous.

An advantage which is worth pointing out in using concrete or a concrete composite like for example steel-reinforced concrete is the inexpensive and time-efficient manufacture thereof. It has been found that specifically when using steel-reinforced concrete, it is possible to produce a carrier structure which is weight-neutral in comparison with known carrier structures and which is markedly less expensive with a comparable load-carrying capacity and which has a damping characteristic which is markedly improved in the sense of being increased. For that reason the use of steel-reinforced concrete is considered to be particularly preferred.

In a further preferred embodiment the carrier structure of the generator rotor is of an annular configuration. The carrier structure can have for example one or more discs or disc portions and/or framework elements and/or folded structure elements and/or spokes. Particularly preferably the carrier structure is in the form of a single disc which is connected radially outwardly by means of generally known connecting elements to the metallic rotor belt and radially inwardly in generally known manner to the hub flange. Depending on whether the hub flange also comprises a metallic material or comprises the same material as the carrier structure, suitable connecting means are to be provided here, from the state of the art.

The carrier structure is preferably made up of a plurality of segments. Segmentation of the carrier structure has on the one hand the advantage that the carrier structure can be manufactured from a plurality of respectively mutually identical prefabricated parts, for example reinforced concrete prefabricated parts. When reducing the number of parts that can ensure cost-efficient and time-efficient manufacture.

The multi-part nature of the carrier structure also contributes to energy dissipation and thus to the damping characteristic over and above the mere choice of material.

In a further preferred configuration a separating gap is provided between the rotor belt and the carrier structure and wherein the carrier structure is connected to the rotor belt along the separating gap in force-locking or positively locking relationship but not in material-bonded relationship. Further preferably a separating gap is provided between the carrier structure and the hub flange and wherein the carrier structure is connected along the separating gap to the hub flange in force-locking or positively locking relationship but not in material-bonded relationship.

Preferably the separating gap is partially or completely filled with a filling material having a third degree of damping which is greater than the first degree of damping, particularly preferably equal to or greater than the second degree of damping. The separating gap can be filled for example by means of cement, a curing polymer or the like.

In preferred embodiments the rotor belt and/or the hub flange are made of steel or a steel alloy.

Provided is a generator stator and a generator rotor which rotates relative to the generator stator, wherein the generator rotor is designed as set forth in one of the above-described preferred embodiments. This generator enjoys the same advantages and has the same preferred embodiments as the above-described generator rotor, for which reason attention is directed in that respect to the foregoing description.

The wind turbine has a generator, wherein the generator has a generator stator and a generator rotor which rotates relative to the generator stator.

Provided is a hydroelectric power plant having a flow passage having a flow inlet and a flow outlet, and a water turbine which is arranged in the flow passage and which is operatively connected to a generator for generating electrical energy, wherein the generator has a generator rotor designed in accordance with one of the above-described preferred embodiments.

In this respect also attention is directed to the foregoing description in relation to the advantages achieved.

The invention further concerns a use of concrete; concrete composite, in particular steel-reinforced concrete or fiber-reinforced concrete; solid wood; plywood; laminated timber; glass fiber-reinforced plastic; or carbon fiber-reinforced plastic as a material for a hub flange and/or a carrier structure of a generator rotor of a wind turbine or a hydroelectric power plant. Preferably in that case the generator rotor is designed in accordance with one of the above-described preferred embodiments.

BRIEF DESCRIPTION OF THE SEVERAL VIEWS OF THE DRAWINGS

The invention is described in greater detail hereinafter with reference to the accompanying Figures by means of a number of preferred embodiments by way of example. Identical features or features involving the same function are denoted herein by identical references.

In the drawing.

DETAILED DESCRIPTION

Figure 1A:
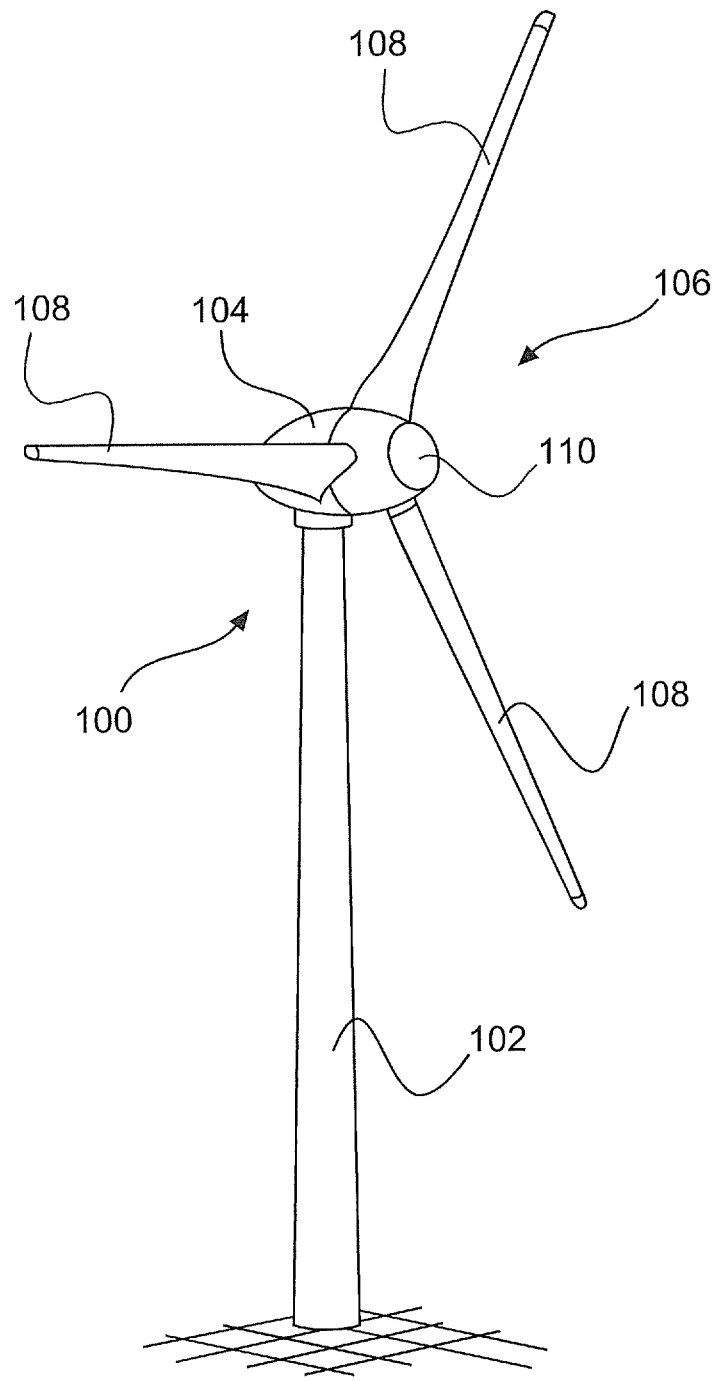
FIG. 1a shows a diagrammatic perspective view of a wind turbine.
Figure 2:
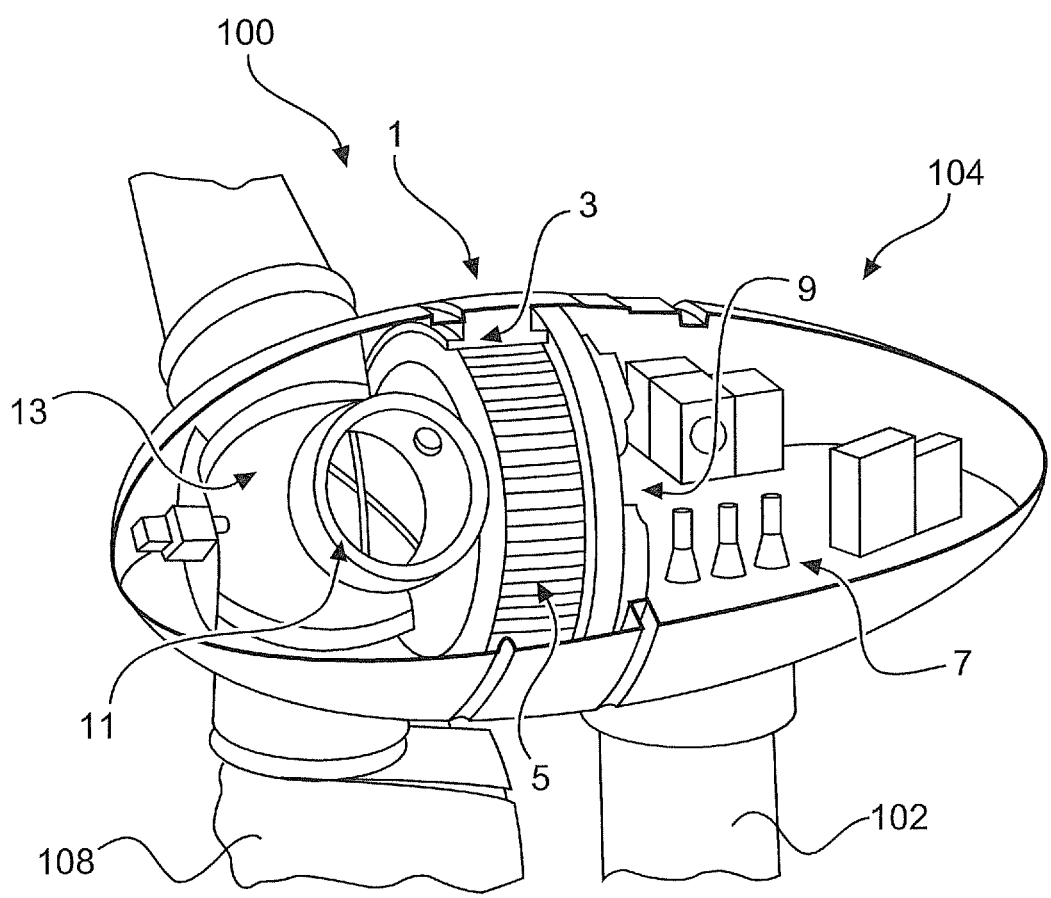
FIG. 2 diagrammatically shows a perspective view in section of a pod of the wind turbine shown in FIG. 1a, FIG. 3a shows a diagrammatic perspective partial view of a generator for the wind turbine shown in FIGS. 1 and 2.

FIG. 1a shows a wind turbine 100 comprising a tower 102 and a pod 104. A rotor 106 having three rotor blades 108 and a spinner 110 is arranged on the pod 104. In operation the rotor 106 is caused to rotate by the wind and thereby drives a generator 1 (FIG. 2) in the pod 104.

Figure 1B:
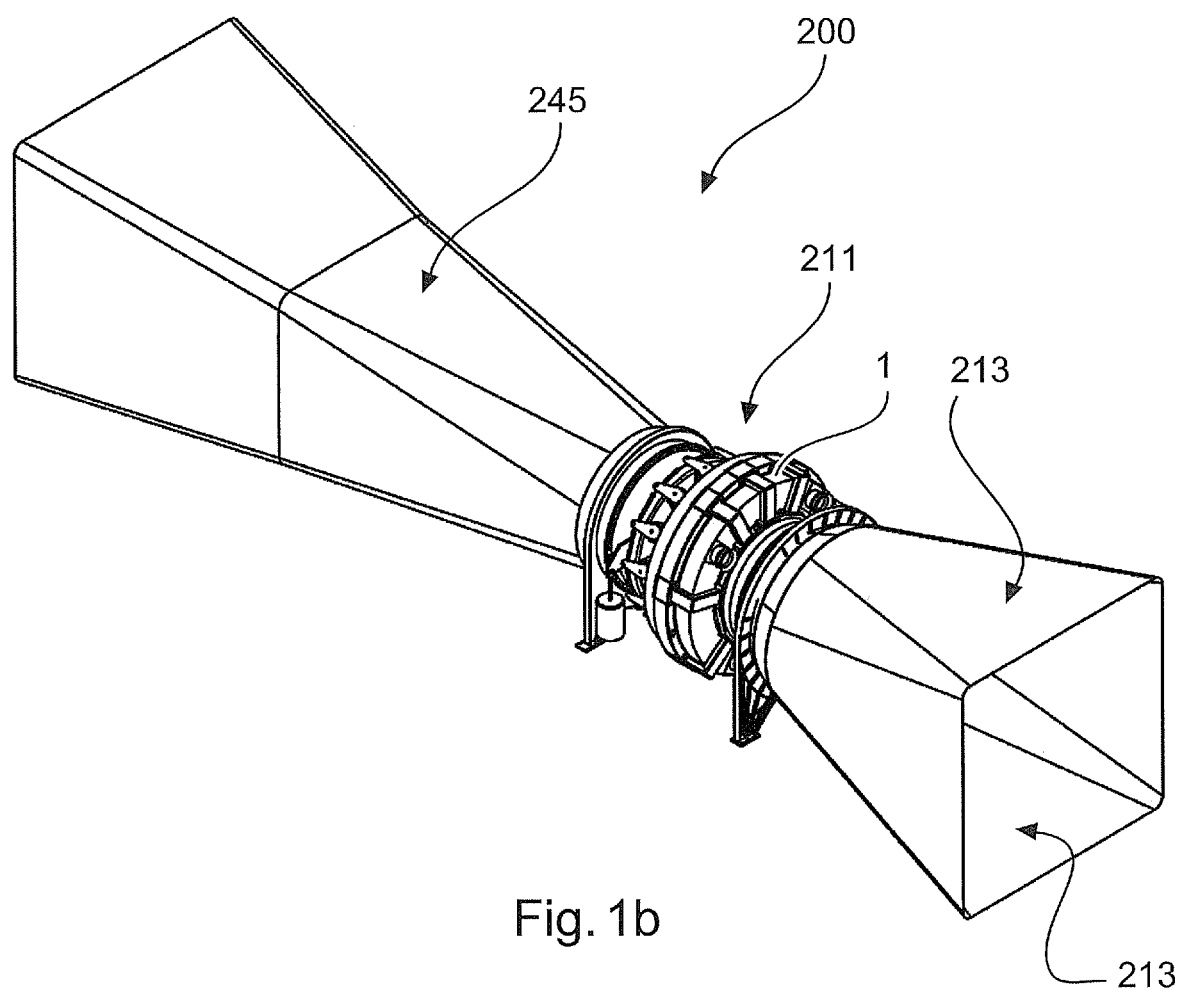
FIG. 1b shows a diagrammatic perspective view of a hydroelectric power plant.

FIG. 1b shows a hydroelectric power plant 200. The hydroelectric power plant 200 has a water turbine 211 driven by water which flows through a flow passage. The water turbine 211 is arranged between a flow inlet 213 and a flow outlet 215 and has a generator 1, in particular a multi-pole, slowly rotating synchronous ring generator. The generator 1 is designed as shown in FIGS. 2 to 4b described hereinafter, with the structural exception that its hub flange (not shown) does not necessarily have to be connected to a drive shaft, but alternatively also directly to a number of turbine blades which rotate in the flow passage. In that respect this is referred to as a so-called straight-flow turbine. In particular the invention also concerns a straight-flow axial turbine. The pod 104 of the wind turbine 100 is shown in greater detail in FIG. 2.

The pod 104 is mounted rotatably to the tower 102 and is connected in driven relationship in generally known manner by means of an azimuth drive 7. In a further generally known manner a machine carrier 9 is arranged in the pod 104, holding a generator 1 which is preferably in the form of a synchronous generator. The generator 1 is designed in accordance with the present invention and is in particular a slowly rotating, multi-pole synchronous ring generator. The generator 1 has a generator stator 3 and an internally rotating generator rotor 5, also referred to as the rotor member. The generator rotor 5 is connected to a rotor hub 13 which transmits the rotary movement of the rotor blades 108, that is caused by the wind, to the synchronous generator 1.

Figure 3A:
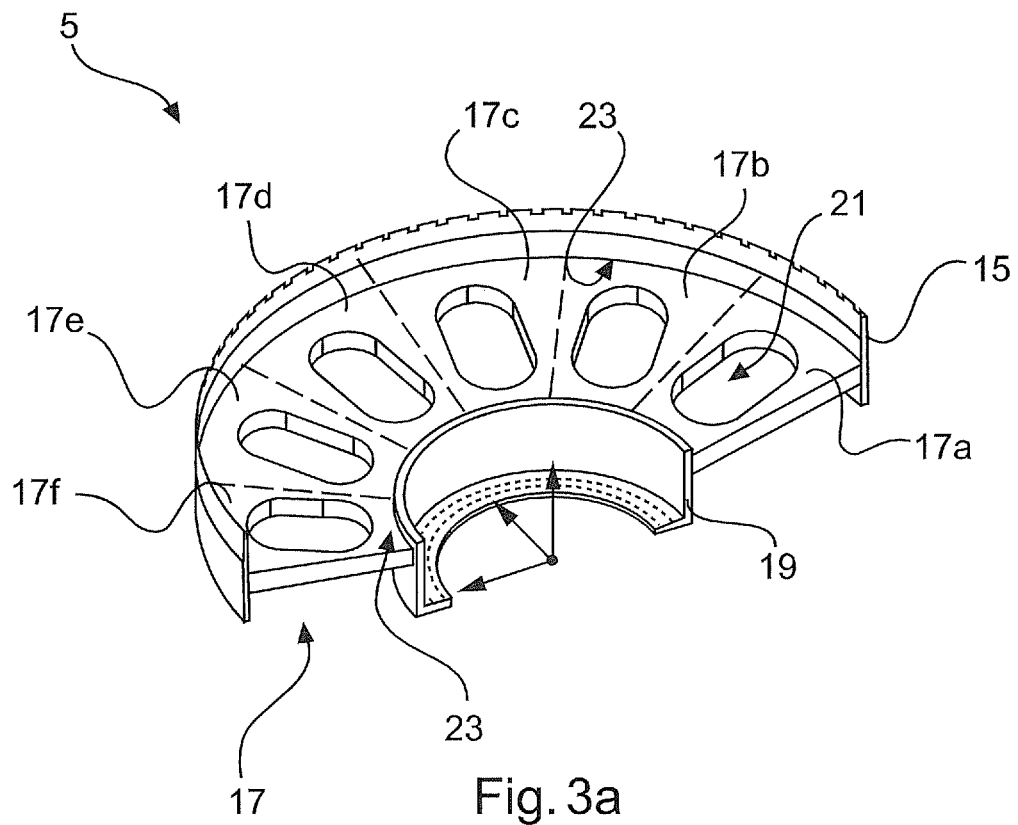
FIG. 3b shows a further diagrammatic perspective view of the part shown in FIG. 3a, FIG. 4a shows a diagrammatic detail view of a first fixing variant for the generator rotor of FIGS. 3a and 3b.
Figure 3B:
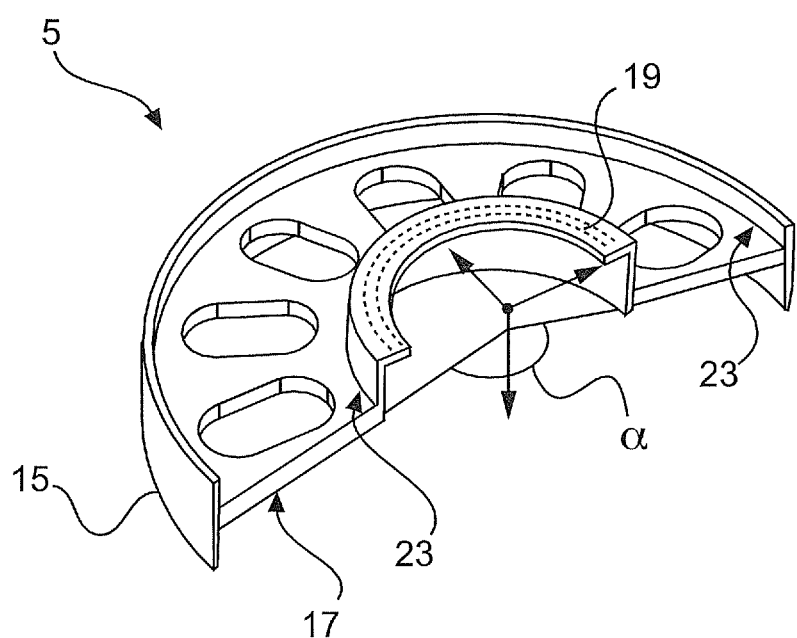
Figure 4A:
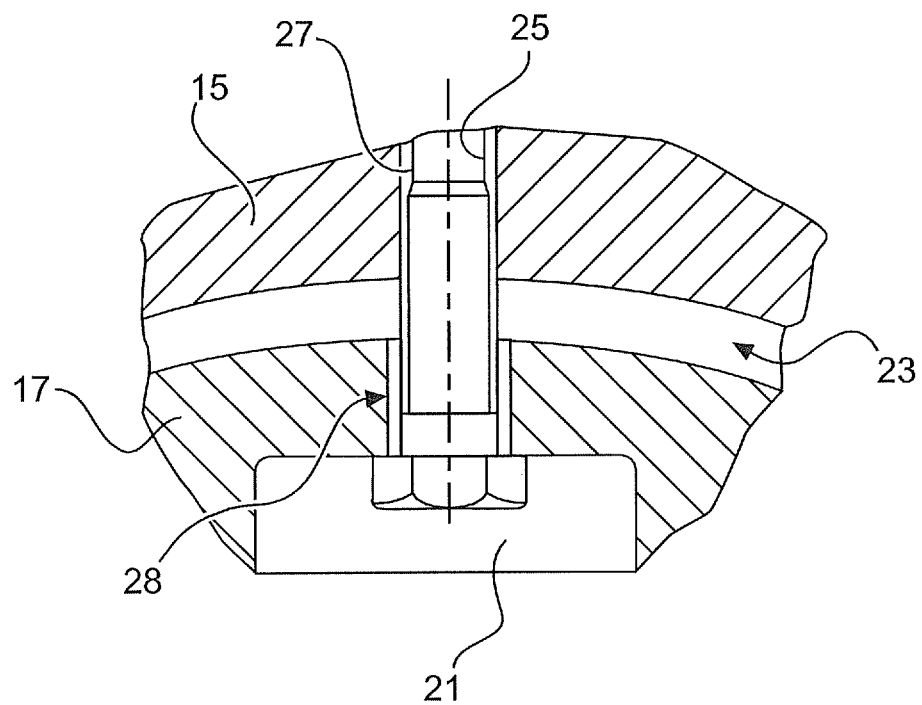
FIG. 4b shows a second fixing variant for the generator rotor shown in FIGS. 3a and 3b.

Details of the generator 1 are shown in FIGS. 3a, b and FIGS. 4a, b. The generator rotor 5 is shown as a part thereof in section in FIGS. 3a and 3b. The generator rotor 5 has a carrier structure 17 formed from a plurality of segments 17a-f. The segments 17a-f are preferably prefabricated components, particularly preferably of steel-reinforced concrete. The carrier structure 17 is connected to a rotor belt 15. The rotor belt 15 is adapted to receive the pole shoes (not shown) of the generator 1. On the radially oppositely disposed inward side the carrier structure 17 is connected to a hub flange 19. The hub flange 19 is adapted for fitting to a main or transmission shaft of the wind turbine.

The rotor belt 15 and the hub flange 19 are preferably of steel or a steel alloy.

The carrier structure 17 has a plurality of openings 21 which serve as through-flow openings for air and in addition serve the purpose of saving weight and improving handlability of the carrier structure 17.

The carrier structure 17 is of a substantially disc-shaped configuration but optionally is of a slightly frustoconically shaped contour which can be described with a cone angle a, see FIG. 3b.

Figure 4B:
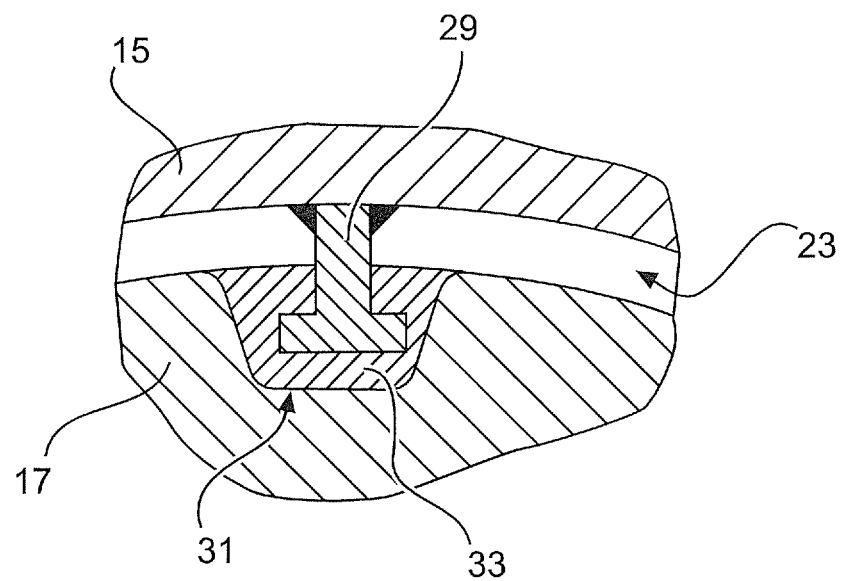

FIGS. 4a and 4b show various fixing options for connecting the carrier structure 17 to the rotor belt 15. The same fixing variants are preferably also to be provided for connecting the carrier structure 17 to the hub flange 19. This is not shown separately here for the sake of enhanced clarity of the drawing.

As the invention involves moving away from a completely monolithic structure for the generator rotor, provided between the rotor belt 15 and the carrier structure 17 (and preferably equally between the carrier structure 17 and the hub flange 19, see FIGS. 3a and 3b), is a separating gap 23. The separating gap 23 is bridged over by means of a number of fixing means along its periphery.

In the variant shown in FIG. 4a the fixing means proposed are screws 27 which extend through a corresponding opening 28 in the carrier structure 17 and are screwed into a corresponding threaded bore 25 in the rotor belt 15 to form a force-locking connection. The separating gap 23 is preferably of such a dimension that the carrier structure 17 and the rotor belt 15 bear against each other in the assembled condition, but are not pressed against each other.

In a second fixing variant shown in FIG. 4b the carrier structure 17 is fixed to the rotor belt 15 along the separating gap by means of a number of head bolt connections 29. At the rotor belt 15 the head bolt connections are welded thereto and engage into openings 31 in the carrier structure 17. After positioning of the carrier structure 17 relative to the rotor belt 15 has been effected those openings 31 are filled with a hardening material 33. The hardening material can be for example cement or a curing polymer, for example synthetic resin. In the variant shown in FIG. 4b the separating gap 23 is preferably also of such a dimension that the carrier structure 17 and the rotor belt 15 bear against each other in the assembled state, but are not pressed together. As an alternative to the preferred configuration, the separating gap 23 can also be partially or completely filled with a hardening material, for both variants (FIG. 4a and FIG. 4b). Particularly preferably the material partially or completely filling the separating gap 23 is not fully elastic, but also has a third degree of damping preferably greater than the first degree of damping of the rotor belt 15 and particularly preferably equal to or greater than the second degree of damping of the carrier structure.

The invention claimed is:

1. A generator rotor for a generator of a wind turbine or a hydroelectric power plant, comprising:
   a rotor belt for holding a plurality of pole shoes,
   a hub flange for fixing the generator rotor to a shaft of the wind turbine, or for fixing to at least one turbine blade of the hydroelectric power plant, and
   a carrier structure non-rotatably connected to the rotor belt and to the hub flange,
   wherein the rotor belt comprises a metallic material having a first degree of damping and at least one of: the carrier structure or the hub flange partially or completely comprises a material having a second degree of damping, wherein the second degree of damping is higher than the first degree of damping.

2. The generator rotor according to claim 1 wherein the first degree of damping is in a region of 0.002 or less.

3. The generator rotor according to claim 2 wherein the first degree of damping is in a region of 0.0015 or less.

4. The generator rotor according to claim 1 wherein the second degree of damping is n times the first degree of damping, wherein n is equal to 2 or higher.

5. The generator rotor according to claim 1 wherein at least one of: the carrier structure or the hub flange, partially or completely, comprises at least one of the following materials:
- concrete;
- concrete composite;
- steel-reinforced concrete;
- fiber-reinforced concrete;
- wood;
- plywood;
- laminated timber;
- glass fiber-reinforced plastic; or
- carbon fiber-reinforced plastic.

6. The generator rotor according to claim 1 wherein the carrier structure is of an annular configuration.

7. The generator rotor according to claim 1 wherein the carrier structure is made up of a plurality of segments.

8. The generator rotor according to claim 1 comprising a separating gap between the rotor belt and the carrier structure, and wherein the carrier structure is connected to the rotor belt along the separating gap.

9. The generator rotor according to claim 8 wherein the separating gap is partially or completely filled with a filling material having a third degree of damping that is greater than the first degree of damping.

10. The generator rotor according to claim 9 wherein the third degree of damping is equal to or greater than the second degree of damping.

11. The generator rotor according to claim 8 wherein the carrier structure is locked to the rotor belt.

12. The generator rotor according to claim 1 comprising a separating gap between the carrier structure and the hub flange, and wherein the carrier structure is connected to the hub flange along the separating gap.

13. The generator rotor according to claim 1 wherein at least one of: the rotor belt or the hub flange is made of steel or a steel alloy.

14. A generator of a wind turbine or a hydroelectric power plant, comprising:
- a generator stator; and
  - the generator rotor according to claim 1, wherein the generator rotor rotates relative to the generator stator.

15. A wind turbine, comprising:
- a generator, wherein the generator has a generator stator and the generator rotor according to claim 1, wherein the generator rotor rotates relative to the generator stator.

16. A hydroelectric power plant, comprising:
- a flow passage having a flow inlet and flow outlet, and
- a water turbine arranged in the flow passage and operatively connected to a generator for generating electrical energy, wherein the generator has the generator rotor according to claim 1.

17. A method comprising:
- forming a rotor belt configured to hold a plurality of pole shoes;
- forming a hub flange, wherein the hub flange is configured to fix a generator rotor to a shaft of a wind turbine or to a plurality of turbine blades of a hydroelectric power plant, and
- coupling a carrier structure to the rotor belt and the hub flange,
- wherein the rotor belt includes a metallic material having a first degree of damping,
- wherein at least one of: the carrier structure or the hub flange includes a material having a second degree of damping, and
- wherein the second degree of damping is higher than the first degree of damping.

18. The method according to claim 17 wherein forming the hub flange comprises forming the hub flange from one or more of the following materials:
- concrete;
- concrete composite;
- steel-reinforced concrete;
- fiber-reinforced concrete;
- wood;
- plywood;
- laminated timber;
- glass fiber-reinforced plastic; or
- carbon fiber-reinforced plastic.

* * * * *